US012654052B2

(12) United States Patent
Hinrichs

(10) Patent No.: US 12,654,052 B2
(45) **Date of Patent: *Jun. 16, 2026**

(54) FIRE SUPPRESSANT

(71) Applicant: Green Canyon Ventures LLC, Miami, FL (US)

(72) Inventor: Rodolfo Hinrichs, Miami, FL (US)

(73) Assignee: Green Canyon Ventures LLC, Miami, FL (US)

( * ) Notice: Subject to any disclaimer, the term of this patent is extended or adjusted under 35 U.S.C. 154(b) by 916 days.

This patent is subject to a terminal disclaimer.

(21) Appl. No.: 17/809,038

(22) Filed: Jun. 27, 2022

(65) Prior Publication Data

US 2022/0323810 A1 Oct. 13, 2022

Related U.S. Application Data

(63) Continuation-in-part of application No. 17/431,478, filed as application No. PCT/US2020/046099 on Aug. 13, 2020, now Pat. No. 11,844,975.

(60) Provisional application No. 62/886,388, filed on Aug. 14, 2019.

(51) Int. Cl.
*A62D 1/00* (2006.01)

(52) U.S. Cl.
CPC .................................. *A62D 1/0042* (2013.01)

(58) Field of Classification Search
CPC ... A62D 1/0042; A62D 1/0071; A62D 1/0035
See application file for complete search history.

(56) References Cited

U.S. PATENT DOCUMENTS

| | | | | |
|---|---|---|---|---|
| 2009/0212251 | A1 | 8/2009 | Stewart | |
| 2010/0181084 | A1 * | 7/2010 | Carmo | A62D 1/0035 169/45 |

FOREIGN PATENT DOCUMENTS

| | | |
|---|---|---|
| ES | 2330354 | 12/2009 |
| GB | 1286071 | 8/1972 |
| WO | WO2006052245 | 5/2006 |

* cited by examiner

*Primary Examiner* — Andrew J. Oyer
(74) *Attorney, Agent, or Firm* — Defillo & Associates, Inc.; Evelyn A. Defillo

(57) ABSTRACT

A fire suppressant including in weight percent technical urea 10-30%, ammonium sulphate 20-50%, and sodium bentonite 12-26%. The fire suppressant further includes polypropylene glycol (polyglycol), alkyl sulfonic acid, castor oil, guar gum, and/or triethanolamine dodecylbenzene sulfonate. The fire suppressant does not pose any risk to plant or animal life since the product is completely benign and is classified as non-toxic. It does not cause any damage to aquifers or groundwater, and it biodegrades in 30 to 60 days.

3 Claims, No Drawings

FIRE SUPPRESSANT

CROSS REFERENCE TO RELATED APPLICATION

This application is a continuation-in-part of U.S. application Ser. No. 17/431,478, filed Aug. 17, 2021, entitled, FIRE SUPPRESSANT, pending, which is a national stage entry of PCT/US2020/046099 filed Aug. 13, 2020, filed under the International Convention and claiming priority over U.S. Provisional Application No. 62/886,388 filed Aug. 14, 2019, the contents of all of them are incorporated herein by reference.

FIELD OF THE INVENTION

The field of the invention is fire suppression. The purpose of the invention is to provide a tool to suppress various types of fires and prevent their advance. It may be used in forest fires and structural fires, as it is environmentally friendly, biodegradable, and innocuous.

BACKGROUND OF THE INVENTION

When fighting fires, several types of products may be used. Most of them work by ensuring that the reaction that causes fire (fuel+heat+oxygen) is hindered by removing one of the essential elements, usually the ambient oxygen. Fire retardants attempt to both remove the oxygen and to create a barrier that separates both reactants (fuel and oxygen). Some products work by lowering the temperature, so combustion is not possible.

Some examples of products used in firefighting are found in ES2330354, US2009212251, WO2006052245 or GB1286071.

SUMMARY OF INVENTION

The present invention is a powder, liquid concentrate or foam chemical compound that can also be dissolved very easily in water or similar polar liquids. Its primary characteristics are:

Retards, blocks and suppresses fire.

Biodegradable.

Non-toxic, free of heavy metals and halogens. It can be used in ecologically sensitive environments.

Noncorrosive.

No PFAS (Per- and polyfluoroalkyl substances).

The product is easily soluble in water or other polar liquids, with any known mechanical or manual process for mixing and distributing.

The fire suppressant's primary components are clay and the nitrogen compounds Technical Urea and Ammonium Sulphate and/or Ammonium polyphosphates. The nitrogen compounds will degrade when exposed to high temperatures so the nitrogen will remove the oxygen present in the ambient air, cooling the area. The clay and the rest of the components will form a barrier that prevents further ignition. The reaction will also absorb heat, lowering the air temperature dramatically. This three-pronged assault allows the product to suppress and not only retard the fire.

When the fire suppressant comes into contact or interacts with the heat caused by a fire, through radiation and convection, it starts a chemical endothermic chain reaction that causes first an increase in humidity and then a rapid emanation of intense cold, thereby breaking the fire cycle. This emanation of massive cold in the form of nitrogen (cold gas) not only dramatically lowers the temperature in the surrounding area, but also displaces a large portion of the available oxygen, isolating the fuel, preventing the oxidation of the combustible material. This reaction is completely harmless to humans, since the air we breathe is comprised of 78% nitrogen, and there will always be some remaining oxygen in the affected area (allowing a firefighter or person trapped in the fire to breathe easily). Thus, the three required elements for combustion (heat, oxygen, and fuel) are separated. At this point, the fire will slowly go out and will not reignite.

Forest fires generally reach an average temperature of roughly 1800° F., but in the area to which the fire suppressant has been applied and the surrounding area, the temperature descends drastically to an average of 140° F., a temperature at which the continuation of fire becomes impossible. At the same time, the presence of nitrogen in the area as a cold, inert gas prevents the fire from spreading beyond the application zone. The product also prevents the reignition of the fire once it has been extinguished, since its effect on treated vegetation lasts for a minimum of 10-15 days, provided it does not rain. The fire suppressant lowers the ambient temperature, so it is possible to walk in the area sooner after the fire.

The Fire Suppressant does not pose any risk to plant or animal life, since the product is completely benign and is certified as non-toxic. First, it does not cause any damage to aquifers or groundwater and, second, it biodegrades completely. During this time, the fire suppressant continues to protect the application area from reignition, at least for 15-20 days without rain.

Due to the fact it is not corrosive to metals or other materials, the fire suppressant can be used in backpack pumps, portable pumps, sprinkler systems in homes or buildings, as well as applied from the air using airplanes or helicopters, or using vehicles such as pick-up trucks.

In structural or urban fires, as well as fires on ships and aircraft, the massive cooling effect of the fire suppressant in the area of application when it comes into contact with fire can be highly beneficial to firefighting brigades. When a firefighter starts to apply the fire suppressant to the fire, it begins to emanate an intense cold, which lowers the high ambient temperature in the area, and allows a ground team to advance into the affected area quickly and safely, to directly combat the flames more effectively, which is generally not possible due to the radiated heat around the fire's center, which prevents access to the area.

The use of the product in structures provides two primary benefits, which are greater speed in the extinction of the fire and a reduced need for water, since water is only the medium used for applying the product, which reduces the water damage to structures. This translates into a reduction of approximately two thirds in the amount of time it takes to extinguish a fire compared to using water alone.

On ships and aircraft, the fire suppressant can also provide a great benefit due to its cooling properties. It allows for a fire to be extinguished more rapidly, in order to save the ship and human lives. In addition, the Fire Suppressant does not react negatively with petroleum-based or other fuel fires. The foam version works very well on this kind of fire.

Although the recommendation is for the product to be mixed with fresh water, it can also be mixed with sea water in the case of ships, seaplanes or structures close to the waterfront.

Due to the non-corrosive qualities, it can be applied on any metallic surface. However, it would be convenient to clean the affected areas with pressurized water.

The fire suppressant is not recommended for use on electrical fires. Although the fire suppressant would be able to extinguish an electrical fire, the affected area, which conducts electricity, would be wet from the water the fire suppressant is diluted in, and there is a risk of electrocution to people in the area.

In case of emergency, the fire suppressant may be sprayed over any persons in actual danger, so as to save their lives.

In forest fires, due to the expanse of land, an indirect attack is recommended, by applying the product safely ahead of the advance of a wildfire, to form a firewall that suppresses the fire once it reaches the application zone and allows firefighters to safely and effectively follow up with a direct attack, if necessary. Safe application is a very important factor, since firefighters can combat the fire from a distance without risking human lives. The possibility of a direct attack is especially useful to defend a specific area or human lives.

The fire suppressant can be applied from land or air, in a direct or indirect attack or as a firewall about 15-50 ft wide, depending on the climate, the topography of the terrain and the type of vegetation (density, type, characteristics, etc.). The vegetation in the application zone must be treated completely, wetting down the entire area.

The product is applied using existing equipment commonly used for firefighting.

For application from land, the equipment generally used are backpack pumps, portable pumps, motor pumps, or trucks fitted with tanks and pumps with hoses or any other device for spraying or applying the product. The product is not meant to be applied with fumigation equipment, since the reduced size of the applicator opening would prevent all the particles of the product from passing through.

From the air, the fire suppressant can be applied from any type of airplane, drone or helicopter that is generally used for firefighting, or from any other aircraft modified for this purpose. The product is dropped in a continuous and overlapping manner until the firewall area is treated in advance of the fire. The aerial application technique is identical to that of existing fire retardants.

In the case of private individuals or businesses that may want to use the product to defend their property, it can be applied using a hose, home outdoor irrigation sprinkler system, or a dedicated sprinkler system used for fire protection. A tank would be added to the system with a concentrated quantity of the product that would be added to the water prior to spraying during a predetermined time and dosage. Other techniques would be used if the fire suppressant is in powder form.

For structural or urban fires and fires on ships, the fire suppressant can be applied in one of two ways. First, through the existing sprinkler system, to which the product is added automatically using a Venturi injector mechanism or other proportioner system. Second, through direct combat at the source of the fire. Firefighters apply the product using hoses, backpack pumps, or other types of fire extinguisher sprayers directly on the fire. This will produce an almost instantaneous reaction by which the Fire Suppressant will begin giving off extreme cold in the application zone, which will in turn lower the ambient temperature and allow fire crews to advance through the affected area more rapidly. In the case of fires on aircraft, the Fire Suppressant is applied using trucks fitted with pumps and hoses. Foam Fire Suppressant will usually be used in this kind of fires.

For fuel fires, use of the foam version of the fire suppressant is recommended.

The basic components are:

Technical urea 13-65% (by weight)

Modified clays (natural, transformed, micronized or in nanoparticles) 12-26%. The clays used in the manufacturing of the fire suppressant are modified primary clays, generally from the group of kaolinites (kaolin, bentonites, sepiolite, etc.), which have been transformed or micronized. Other clays with nanoparticles between 1 and 100 nanometers may be used. The particle size is not relevant.

One or both of ammonium polyphosphates and/or ammonium sulphate, up to 40%

The clay increases the structure and density of the product. It also protects the materials by absorbing heat and reduces the escape of nitrogen gases and ashes. It creates a protective layer on the surface of the vegetation.

The rest of the Fire Suppressant is comprised of one or more of the following compounds, so as to reach 100% mass:

Thickeners (Guar gum . . . ) 0-10%. Its main use is when the product needs more density, usually for air application. It may be raised if needed, up to 19%.

pH modifiers 0-10%. pH should remain between 6-7. E.g., phosphoric, acetic, or ascorbic acid.

Polypropylene glycol 0-15%. It protects the material from extreme heat, and helps the product adhere to the surface of the application area and keeps all the components of the formula together Emulsifiers 0-15%. Usually, cellulose based.

Coloring 0-15%. The pigments will depend on the desired color. An example would be "red fugitive".

During fabrication, the Fire Suppressant is heated to between 130 and 240° F. (54-115° C.).

This way the materials are ready to use and store for their intended purpose.

Color or pigments may be added for commercial reasons depending on the type of product. For example, for forest fires, a red color is added to the product, generally iron oxide, so that application of the product is clearly identifiable from the air. For the rest of fires, the product generally retains its regular whitish shade. Additional color may be added as commercially required for various industries. The addition of color does not affect the product's qualities or effectiveness.

The fire suppressant initially presents as either a white powder, milky liquid, or foam. The color can be modified with pigments. The product will usually have a density of 0.8-1 g/cm$^3$. It can be commercially sold in a concentrated liquid version. The liquid concentrate will usually have a density of 1.4 g/cm$^3$, a viscosity equal to or greater than 200 cps, and a pH of 6-7. A foam version of the product will also be made commercially available, primarily for use in fuel fires.

The preparation of the product will be a solution of between 17-25% by weight when in powder form, or 10-20% when in concentrate form.

The fire suppressant can be used on forest fires, structural fires, fires on ships and aircraft, and fuel fires.

DETAILED DESCRIPTION OF THE INVENTION

Example 1

The powder version of the fire suppressant according to the invention is made of:

Technical Urea: 17% bentonite clay: 5%

Ammonium Polyphosphate 25%/Ammonium Sulphate 13%

Guar gum: 10%

Alkyl Sulfonic Acid: 3%

Polypropylene glycol: 8%

Cellulose emulsifier 7%

Red fugitive dye: 12%]

Example 2

A second example of the fire suppressant is made of.

Technical Urea: 13% kaolin: 13%

Ammonium Polyphosphate: 12%

Guar gum: 19%

Ascorbic acid: 11%

Polypropylene glycol: 13%

Cellulose emulsifier: 9%

Red fugitive dye: 10%

What is claimed is:

1. A fire suppressant consisting of in weight percent:
technical urea 13-65%;
modified clays 12-26%; BR
at least one of ammonium polyphosphates or ammonium sulphate up to 40%; and
up to 15% of coloring agents;
and heated between 13° and 240° F.

2. A fire suppressant consisting of in weight percent:
technical urea 13-65%;
modified clays 12-26%;
al least one of ammonium polyphosphates or ammonium sulphate up to 40%; and
up to 15% of polypropylene glycol.

3. A fire suppressant consisting of in weight percent:
technical urea 13-65%;
modified clays 12-26%;
at least one of ammonium polyphosphates or ammonium sulphate up to 40%;
remaining balance water, thickeners 0-10%,
emulsifiers 0-15%,
and heated between 13° and 240° F.

* * * * *